No. 11,710. Reissued Jan. 24, 1899.
T. C. ROBINSON.
ELECTRICAL HAMMERING MACHINE.
(Application filed Nov. 22, 1897.)
2 Sheets—Sheet 1.
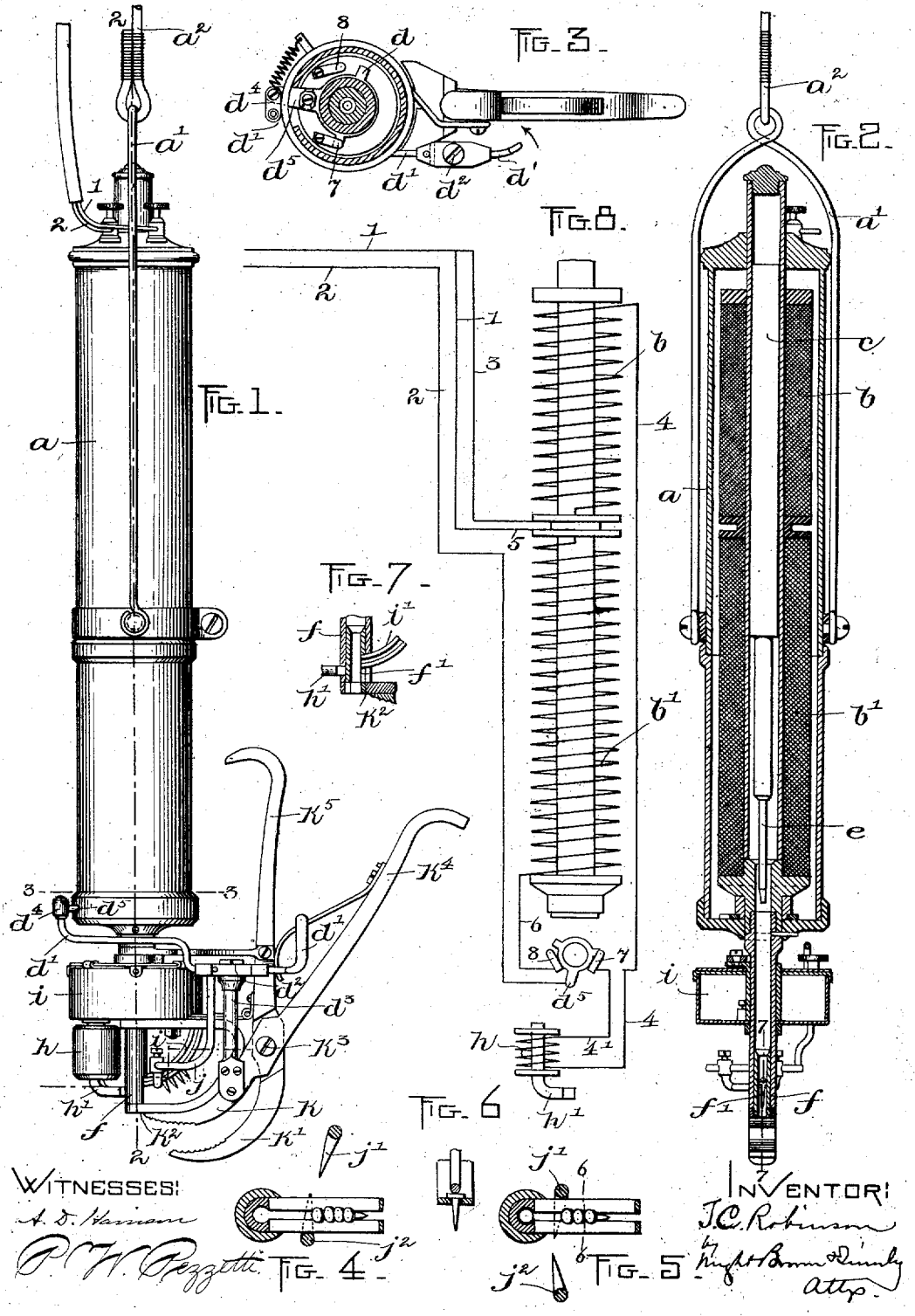

No. 11,710. Reissued Jan. 24, 1899.
T. C. ROBINSON.
ELECTRICAL HAMMERING MACHINE.
(Application filed Nov. 22, 1897.)
2 Sheets—Sheet 2.
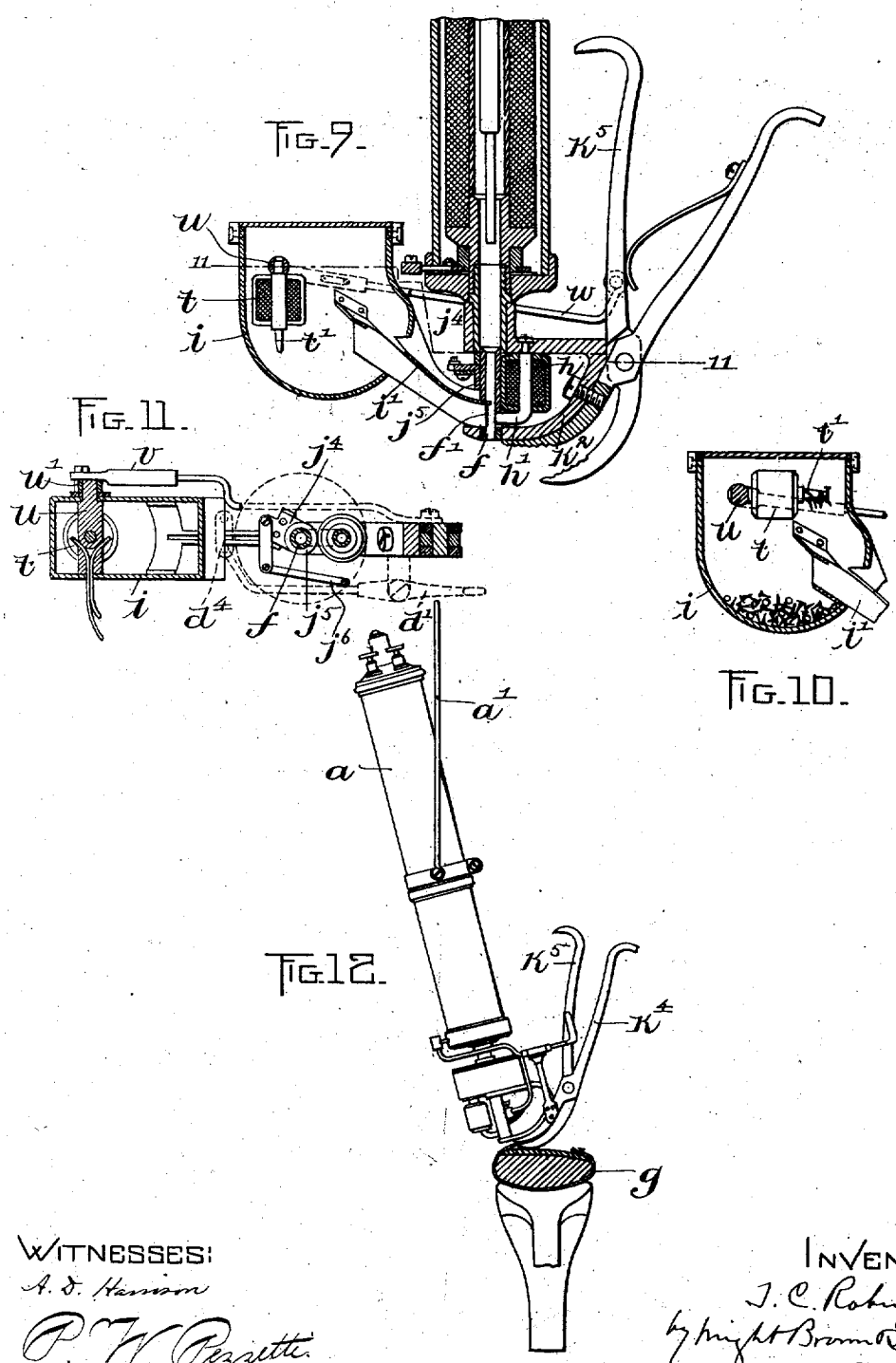
WITNESSES:
A. D. Harrison
P. W. Pezzetti
INVENTOR:
T. C. Robinson
by Wright Brown & Quinby
Attys.

UNITED STATES PATENT OFFICE.

THOMAS C. ROBINSON, OF BOSTON, MASSACHUSETTS, ASSIGNOR OF ONE-HALF TO ARTHUR E. DENISON AND E. BAKER WELCH, OF CAMBRIDGE, MASSACHUSETTS.

ELECTRICAL HAMMERING-MACHINE.

SPECIFICATION forming part of Reissued Letters Patent No. 11,710, dated January 24, 1899.

Original No. 566,537, dated August 25, 1896. Application for reissue filed November 22, 1897. Serial No. 659,535.

*To all whom it may concern:*

Be it known that I, THOMAS C. ROBINSON, of Boston, in the county of Suffolk and State of Massachusetts, have invented certain new and useful Improvements in Electrical Hammering-Machines, of which the following is a specification.

This invention relates to portable or hand-controlled hammering-machines, and particularly to such machines as are used for driving tacks for the attachment of uppers to soles of lasted boots or shoes in the operation of lasting.

The invention has for its object to provide an improved means for operating the hammer or driver of a tack-driving or other similar machine by electricity.

The invention consists in the several improvements, which I will now proceed to describe and claim.

Of the accompanying drawings, forming a part of this specification, Figure 1 represents a side elevation of my improvements embodied in a lasting-machine. Fig. 2 represents a section on the line 2 2, Fig. 1. Fig. 3 represents a section on the line 3 3 of Fig. 1 and a plan view of the mechanism below said line. Fig. 4 represents a section on line 4 4 of Fig. 1, looking downwardly. Fig. 5 represents a view similar to Fig. 4, showing the let-off devices in a different position. Fig. 6 represents a section on line 6 6 of Fig. 5. Fig. 7 represents a section on line 7 7 of Fig. 2. Fig. 8 represents a diagram of the electrical connections. Fig. 9 represents a sectional view of a portion of the machine, showing electromechanical means for feeding tacks to the throat of the machine. Fig. 10 represents a view showing parts of the mechanism of Fig. 9 in a different position. Fig. 11 represents a section on line 11 11 of Fig. 9. Fig. 12 represents a side view showing the lasting-machine and its relation to the lasted boot or shoe when in operation.

The same letters and figures of reference indicate the same parts in all the views.

In the drawings and referring to Figs. 1 to 11, inclusive, *a* represents a casing, preferably of cylindrical form and made of hard rubber or other suitable insulating material. Said casing is preferably mounted or suspended from a support overhead by means of a bail $a'$ and a flexible suspension device $a^2$.

*b b'* represent two solenoids, which are arranged end to end within the casing and suitably attached thereto, the longitudinal cavities in the solenoids being in line with each other, so that they constitute a continuous tubular passage, in which the core or armature *c* is adapted to move endwise. The two solenoids are included in a branched electric circuit, one branch of which includes the solenoid *b* and the other the solenoid *b'*, the connections being as shown in the diagram in Fig. 8, in which 1 2 represent the main wires of the circuit, while 3 and 4 represent the wires which, with the solenoid *b*, constitute one branch of the circuit, the wires 5 and 6 constituting, with the solenoid *b'*, the other branch of the circuit.

*d* represents a switch which is adapted to close the circuit through either branch and break the circuit through the other, said switch being mounted to turn upon a suitable support or bearing connected with the casing *a* and coöperating with contact-springs 7 and 8. When the switch is in the position shown in full lines in Fig. 8, it connects the parts 1 and 2 of the circuit through the solenoid *b* and breaks the circuit through the solenoid *b'*. When the switch is turned to the reverse position, it closes the circuit through the solenoid *b'* and breaks the circuit through the solenoid *b*. It will be seen, therefore, that by manipulating the switch the operator is enabled to energize each solenoid alternately, the other being at the same time demagnetized, so that by energizing the solenoid *b* the core or plunger *c* will be raised or retracted, while by energizing the solenoid *b'* the core will be projected. To the core *c* is attached a driver *e*, Fig. 2, which when the core is projected or depressed, as above described, is forced into a tack-delivering throat or nozzle *f*, affixed to the casing *a* in line with the core *c*, said driver being adapted when thus projected to drive a tack supplied to the said throat, by means hereinafter described, into the upper and sole of a lasted boot or shoe $g$, which may be supported by a suitable jack or otherwise held for the action of the machine.

For the convenient operation of the switch $d$ I have provided an arm or handle $d'$, which is pivotally connected at $d^2$ to a stud $d^3$, affixed to the machine, and a link $d^4$, connecting said handle with an arm $d^5$, formed on the switch. The handle $d$ is arranged to be conveniently moved by the hand of the operator, and when it is moved in the direction indicated by the arrow in Fig. 3 it moves the switch from the position shown in full lines in Fig. 8 to that shown in dotted lines, thus causing the projection or descent of the driver. When the handle $d'$ is released, a spring $d^6$, connected with a fixed support on the machine and with the arm $d^5$, restores the switch to the position shown in full lines in Fig. 8, this being the normal position of the switch, so that the upper solenoid $b$ is normally in circuit and the solenoid $b'$ is normally demagnetized.

$h$ represents an electromagnet or helix which is located in close proximity to the tack-delivering throat $f$ and has a fixed core $h'$, which is bent laterally toward the throat $f$, its outer end standing in such proximity to the tack-passage in said throat that when the electromagnet $h$ is energized the core $h'$ will attract the tack which may be passing through said throat and hold the tack, as shown in Fig. 7, in position to be forced out by the driver. The electromagnet $h$ is included in the branch of the circuit that includes the solenoid $b$, and is shown in Fig. 8 as connected at one end with the wire 4 and at the other end by a wire 4' with the contact-spring 7, the electromagnet $h$ and wire 4' being therefore a part of the branch of the circuit that includes the solenoid $b$. The electromagnet $h$ is therefore normally energized, so that whenever the driver is raised and a tack is delivered to the throat $f$ said tack is detained by the core $h'$ until the solenoid $b$ is demagnetized and the solenoid $b'$ magnetized to cause the projection of the driver, the core $h'$ being demagnetized with the solenoid $b$, so that it releases the tack just as the driver descends.

$i$ represents a tack-reservoir secured to a suitable part of the machine, preferably the throat $f$, said reservoir communicating with a tack-chute $i'$, adapted to conduct tacks to the lower portion of the throat, where a slot $f'$ is provided to permit the entrance of the tacks one at a time to the throat, said slot being located so that each tack delivered by the chute to the throat comes within the field of force of the core $h'$ and is attracted by the latter. A suitable let-off device is employed for admitting one tack at a time to the throat $f$, said let-off device, as shown in Figs. 1, 2, 4, and 5, comprising an arm or stud $j$, affixed to the switch-operating handle $d'$, and two gates or spurs $j'$ $j^2$, which are arranged to be moved by the above-described switch-operating movements of the handle $d'$ alternately across the column of tacks, as shown in Figs. 4 and 5. When the handle $d'$ is moved to energize the solenoid $b'$ and project the driver, the spurs $j'$ $j^2$ are moved to the position shown in Fig. 5, the spur $j^2$ being thus caused to release the lower tack in the column and permit it to enter the throat, while the spur $j'$ engages the next tack, so that not more than one tack can escape at a time. When the handle $b'$ is moved by the action of the spring $d^6$ to restore the switch to its normal position, the spurs $j'$ $j^2$ assume the position shown in Fig. 4, the spur $j^2$ arresting the column of tacks, this movement of the spurs taking place without releasing a tack into the throat $f$.

In Fig. 11 I show the let-off device as an arm $j^4$, formed on a sleeve $j^5$, which is fitted to turn on the throat $f$. Said arm is connected by a rod $j^6$ with the switch-operating lever $d'$. The arm $j^4$ may have any suitable projections, such as the spurs $j'$ $j^2$, to act on the tacks.

$k$ $k'$ represent jaws constituting a pair of pincers, the jaw $k$ being affixed to a frame or holder $k^2$, which is suitably secured to the throat $f$, while the jaw $k'$ is pivoted at $k^3$ to the jaw $k$. Said jaws are provided with operating-handles $k^4$ $k^5$, by which they may be closed. The handles are preferably arranged as shown in Figs. 1 and 9, where they are shown as occupying such position relatively to the switch-operating handle $d'$ that the operator can manipulate both the pincers and the switch with the same hand, the pincers being used to grasp the upper and draw it to place upon the sole before the switch is operated to project the driver. I prefer to make the throat $f$, the pincer-jaws $k$ $k'$, and the frame or holder $k^2$, which connects said jaws to the throat, of brass or aluminium or some other non-magnetic metal in order that there may be no interference by magnetism with the tacks.

In Figs. 9, 10, and 11 I show electromechanical means for feeding tacks to the throat $f$, said means comprising an electromagnet $t$, affixed to a rock-shaft $u$, which is journaled in the tack-reservoir, and a rod $w$, connecting an arm $u'$ on the shaft $u$ with the handle $k^5$ of the movable jaw of the pincers. The electromagnet is connected in the branch of the circuit that includes the solenoid $b$, and is therefore energized with said solenoid. The core $t'$ of the magnet $t$ projects downwardly into the mass of tacks and attracts several tacks when the magnet is energized. When the operator moves the handle $k^5$ to close the pincers, the magnet $t$ is swung over the upper end of the chute $i'$ and holds the attracted tacks in position to drop into said chute, as shown in Fig. 10. When the switch is operated to energize the solenoid $b'$ and demagnetize the solenoid $b$, the magnet $t$ is demagnetized and drops the tacks, which are thus supplied to the chute. When the handle $k^5$ is released, the magnet $t$ swings down into the tacks and is again magnetized by the return of the switch to its normal position.

The solenoids, the core, and the electrical connections constitute an electric motor which alternately projects and retracts the driver or hammer, the whole being supported in a suitable casing or carrier, and constituting a light, simple, and effective apparatus adapted to be easily guided and controlled by the operator. I do not limit myself, however, to the employment of the particular description of electric motor here shown and may employ any other suitable electrical means for projecting and releasing the hammer.

I claim—

1. A portable tack-driving machine, comprising a casing or holder having a tack-delivering throat, means supported by the casing for delivering tacks to the throat, a driver movable in the throat, suitable means for moving the driver in one direction, an electric motor for moving the driver in the opposite direction, and means under the control of the operator for causing the motor to give a single stroke to the driver and then stop.

2. A portable tack-driving machine, comprising a casing or holder having a tack-delivering throat, means supported by the casing for delivering tacks to the throat, a driver movable in the throat, an electromagnet organized to thrust the driver in one direction, means for thrusting the driver in the other direction, an electromagnet-controlling switch, under the control of the operator for causing the motor to give a single stroke to the driver and then stop, and electrical connections between said switch and said magnet.

3. A tack-driving machine comprising a casing or holder, a tack-delivering throat at one end of said casing, means supported by the casing for delivering tacks to the throat, a driver movable in said throat, an electric motor within the casing organized to project and retract the driver, a motor-controlling switch under the control of the operator for causing the motor to give a single stroke to the driver and then stop, and electrical connections between said switch and motor whereby the motor is caused to project and retract the driver.

4. A tack-driving machine comprising a tack-delivering throat, means for supplying tacks thereto, a driver movable in said throat, an electric motor organized to project and retract the driver, a motor-controlling switch, electrical connections between said switch and the motor whereby the motor is caused to project or retract the driver according to the position of the switch, means for yieldingly holding the switch in position to cause the retraction of the driver by the motor, and an operating device for moving the switch from said position.

5. A tack-driving machine comprising a tack-delivering throat, a tack-chute communicating therewith, a driver movable in said throat, an electric motor organized to project and retract the driver, a motor-controlling switch, electrical connections between said switch and the motor whereby the motor is caused to project or retract the driver according to the position of the switch, an operating device for moving the switch from one position to another, and a tack-let-off device connected with said operating device and actuated thereby to supply a tack to the throat when the position of the switch is changed to cause the retraction of the driver.

6. A tack-driving machine comprising a tack-delivering throat, a tack-chute communicating therewith, a driver movable in said throat, an electric motor organized to project and retract the driver, a motor-controlling switch, electrical connections between said switch and the motor whereby the motor is caused to project or retract the driver according to the position of the switch, an operating device for moving the switch from one position to another, a tack-let-off device connected with said operating device and actuated thereby to supply a tack to the throat when the position of the switch is changed to cause the retraction of the driver, a tack-reservoir connected with the chute, a tack attracting and releasing electromagnet in circuit with the motor and movable between the reservoir and chute, and means for moving said electromagnet back and forth, said magnet being alternately energized and demagnetized by the movements of the switch.

7. A tack-driving machine comprising a casing or holder having a tack-delivering throat, two solenoids arranged in line with each other in said holder, a core common to both solenoids, a reciprocating driver carried by said core, means for energizing the solenoids alternately and thereby alternately projecting and retracting the core and driver, said means including a switch and an operating device therefor carried by the holder, a tack-delivering nozzle or throat in line with the driver, means for delivering tacks to said throat, an electromagnet arranged to arrest a tack in the throat for the action of the driver, and connections between said electromagnet and the driver-raising solenoid whereby the magnet is energized when the driver is raised and demagnetized when the driver descends.

8. A tack-driving machine comprising a casing or carrier, a reciprocating driver, an electric motor adapted to project and retract the driver, a tack-delivering throat or nozzle, a tack-reservoir having a raceway entering said throat, a pair of pincers comprising a pivoted jaw and a fixed jaw, a switch and electrical connections coöperating therewith whereby the motor may be controlled, and a switch-operating device arranged in suitable relation to the pincers to be manipulated by the operator.

9. A tack-driving machine comprising a casing or carrier, a reciprocating driver, an electric motor adapted to project and retract the driver, a motor-controlling switch, a tack-delivering throat affixed to the holder in the path of the driver, means for supplying tacks to said throat, a holder attached to said throat, and pincer-jaws supported by said holder, the said holder being of non-magnetic material as set forth.

10. A tack-driving machine comprising a casing or carrier, a reciprocating driver, an electric motor adapted to project and retract the driver, a motor-controlling switch, a tack-delivering throat affixed to the casing in the path of the driver, a tack-reservoir, a raceway extending from said reservoir to the throat, an electromagnet mounted to move in the tack-reservoir and electrically connected with the motor so that it is alternately energized and demagnetized and means for moving said magnet to cause it to stand alternately over the raceway and in or over the mass of tacks in the reservoir.

11. A tack-driving machine comprising a casing or carrier, a reciprocating driver, an electric motor adapted to project and retract the driver, a motor-controlling switch, a tack-delivering throat affixed to the holder in the path of the driver, a tack-reservoir, a raceway extending from said reservoir to the throat, pincer-jaws supported by the frame of the machine, one of said jaws being movable relatively to the other, an electromagnet mounted to move in the tack-reservoir and electrically connected with the motor, and a mechanical connection between said magnet and the movable jaw, whereby the magnet may be caused to stand alternately over the tacks in the reservoir and over the raceway.

12. A tack-driving machine comprising a tack-guiding throat, a tack-reservoir, a chute connecting the reservoir with the throat, a movable electromagnetic tack-supplying device in the reservoir, means for moving said device, a mechanical tack-let-off device in the chute, a driver movable in the throat, an electric motor organized to project and retract the driver, a motor controlling switch, electrical connections between the switch, the motor, and the tack-supplying device whereby the motor is caused to project or retract the driver and the tack-supplying device is energized or demagnetized according to the position of the switch, and a mechanical operating device connected both with the switch and with the let-off device, whereby the switch and let-off device may be simultaneously operated.

In testimony whereof I have signed my name to this specification, in the presence of two subscribing witnesses, this 18th day of November, A. D. 1897.

THOMAS C. ROBINSON.

Witnesses:
C. F. BROWN,
A. D. HARRISON.